United States Patent [19]

Markoff et al.

[11] Patent Number: 4,933,866
[45] Date of Patent: Jun. 12, 1990

[54] METHOD AND APPARATUS FOR GENERATING AESTHETICALLY ALTERABLE CHARACTER DESIGNS

[75] Inventors: Jay Markoff, Spring Valley; John R. Deubert, La Jolla, both of Calif.

[73] Assignee: Vital Lasertype, Inc., San Diego, Calif.

[21] Appl. No.: 274,347

[22] Filed: Nov. 17, 1988

[51] Int. Cl.⁵ ............................................. G06F 15/62
[52] U.S. Cl. .................... 364/518; 340/735
[58] Field of Search ................. 364/518, 519, 521; 340/728, 730, 731, 735, 790

[56] References Cited

U.S. PATENT DOCUMENTS

| | | | |
|---|---|---|---|
| 4,254,468 | 3/1981 | Craig | 340/735 X |
| 4,654,651 | 3/1987 | Kishi et al. | 340/731 |
| 4,675,830 | 6/1987 | Hawkins | 340/731 X |
| 4,774,508 | 9/1988 | Kitahara et al. | 340/790 X |
| 4,799,172 | 1/1989 | Wood et al. | 364/519 |

Primary Examiner—Gary V. Harkcom
Assistant Examiner—Mark K. Zimmerman
Attorney, Agent, or Firm—Nydegger & Harshman

[57] ABSTRACT

A process and system for generating an aesthetically altered character design with the aid of a computer includes the steps of providing the computer with coordinates defining a wide fixed reference character shape, providing the computer with corresponding coordinates defining a narrow fixed reference character shape, providing the computer with a desired degree of alteration to be made to the character shape in relation to one of the reference character shapes, and calculating in the computer coordinates of an aesthetically alterable character shape. Each of the calculated coordinates for the aesthetically altered shape is generated by interpolating in an amount equal to the desired degree between corresponding coordinates to the wide fixed and narrow fixed reference character shapes. When the desired degree of alteration is outside corresponding coordinates of the wide fixed and narrow fixed reference character shape, the calculated coordinates are generated by extrapolating between the corresponding coordinates of the wide fixed and narrow fixed reference character shapes.

20 Claims, 2 Drawing Sheets

METHOD AND APPARATUS FOR GENERATING AESTHETICALLY ALTERABLE CHARACTER DESIGNS

BACKGROUND OF THE INVENTION

1. Field of the Invention

This invention relates to method and apparatus for generating aesthetically alterable character designs for use in the printing industry, and in particular, to a method and apparatus for changing character shapes to accommodate the degree of alteration desired. The alteration can take the form of condensed characters, expanded characters, and any other desired design accommodation.

1. Description of the Prior Art

In the printing industry and typography field, graphic designs, including character designs, can be produced electronically through the use of computers. With the advent of the personal computer, the desktop publishing industry is growing rapidly, utilizing technology available in various kinds of printers, including laser printers, thermal printers, ink jet printers, LED shutters, and the other types of high resolution printer. Historically, typefaces are created with a set of common design characterics, and a font is a set of all characters within a particular typeface. A type font contains all alphanumerics, punctuation marks, special characters, and the like contained in one version of the typeface.

The optical characteristics of typography are important to keep in mind, since optical illusions are often caused by the proximity of various letter shapes and the letter shapes themselves. For example, optical alignment of characters appears correct to the reader, whereas mechanical alignment of the characters may appear awkward and unsightly. Smiilar optical considerations are important in the character shapes themselves.

Typefaces communicates various feelings to the reader, e.g., elegance, tradition, personality, likability, ect. Also, typefaces are suitable for various specific purposes, such as footnotes, headlines, small print, figures, tables, emphasis, etc., the suitably determined by the character shape.

In the printing industry, and especially in the sign making industry, which uses typograhy, it is often required that characters, typically alphanumeric characters such as letters or numbers, be printed with certain height and width constraints. There is often a need to either compress or expand the length of the display, which requires the characters to be either condensed or expanded, while maintaining as fixed the overall character height. In the past, this has been accomplished by optical means using lenses, or digitally by using electronic computers.

In conventional computer horizontal compression of font characters, there is usually a simple linear rescaling along the horizontal axis of the print line. This process reduces the width of the vertical strokes in the various characters, but leaves the horizontal strokes unchanged in thickness. In expanded characters, this process increase the width of vertical strokes, but again leaves horizontal strokes unchanged in thickness. The character height is not changed. The result is unsightly and aesthetically incorrect and thus distorts the overall impression of the character shape to a greater or lesser degree depending upon the specific character and the degree of compression or expansion involved. Though flawed, this is the conventionally used method of altering character widths since it is relatively fast, easy to accomplish by computer, and there is no artistry involved. To date there has been no other practical method or apparatus that allows the character shape to be automatically altered (e.g., condensed, expanded, changed "X" height) with no loss of artistic and aesthetic quality. Again, this is important because of the role of character shape in conveying the appropriate message to the reader.

It is an object of the present invention to provide a method and apparatus for use in the printing and desktop publishing industry for allowing character design shapes to be altered with the aid of a computer while maintaining artistic quality, referred to hereafter as aesthetic alteration.

It is yet another object of the present invention to provide a process and system for generating an aesthetically alterable character design which redesigns itself for the particular degree of compression or expansion to which the character design is being subjected.

It is a further object of the present invention to provide a process and system for generating aesthetically alterable character designs which accommondate a given font to make sure that horizontal and vertical stroke weights remain relatively constant despite compression or expansion.

It is yet another object of the present invention to provide a process and system which allows design accommodations, such as increasing x height as a function of compression or expansion, to be implemented while retaining the aesthetic quality of the character being altered.

A further object of the present invention is to provide a process and system which is relatively simple, fast, and effective to use, and which is also reliable.

Another object of the present invention is to provide a method and system which allows expanded and/or condensed characters to be generated, while maintaining a constant overall character height, which contain a weight, curve, and overall appearance of each character and which remain as close to the desired design appearance as humanly possible.

Further objects of the present invention will become apparent in the full description of the invention taken in conjuction with the drawings set forth below.

SUMMARY OF THE INVENTION

A process and system for generating an aesthetically altered character design with the aid of a computer includes the following steps: providing the computer with coordinates defining a wide fixed reference character shape, providing the computer with corresponding coordinates defining a narrow fixed reference character shape; providing the computer with a design degree of alteration to be made to the character shape in relation to one of the reference character shapes; and calculating in the computer the coordinates of an aesthetically altered character shape. Each of the coordinates for the aesthethically altered shape is calculated by interpolating or extrapolating from the corresponding coordinates in the reference character shapes.

DETAILED DESCRIPTION OF THE DRAWINGS

Figure 1:
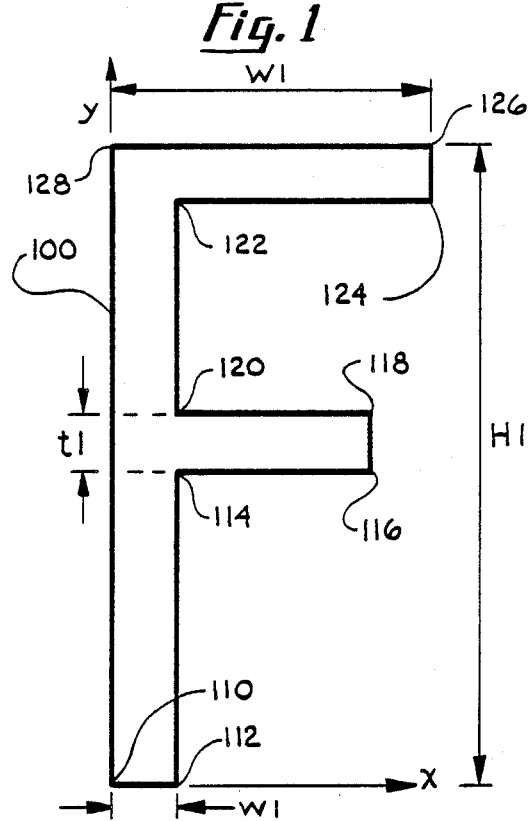
FIG. 1 is a diagrammatic representation illustrating a wide fixed reference character shape in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Refereing now to FIG. 1, there is depicted a wide fixed reference character shape 100, shown in the form of the letter "F". For purposes of explanation, the character shape 100 is shown as a letter, but for all practical purposes could be any desirable shape, in any desired typeface or font. It could, by way of example, be from any of a number of standard type families, such as Universe, Helvetica, Gothic, Letter Gothic, Prestige, Roman, Excelsior, etc. The wide fixed reference character shape 100 could also be any crafted character design desired, including, besides alphanumeric characters, any pictorial design.

With further reference to FIG. 1, the wide fixed reference character shape of "F" is defined by a set of x,y coordinates, at points 110, 112, 114, 116 118, 120, 122, 124, 126, and 128. The width of the vertical stroke of the letter F shown in FIG. 1 is represented by the x axis distance between the x coordinates of points 110 and 112, having a width dimension "w1". Overall height, "H1" of the character is represented as the Y axis distance between the y coordinates of, for example, points 110 and 128. Overall character shape width in FIG. 1 is shown by the dimension "W1". The horizontal strokes of character have a thickness "t1" which is the Y coordinate distance between, for example, points 116 and 118, and points 124 and 126. It should also be mentioned that although the character of FIG. 1 is defined as a wide fixed reference character, it is not necessarily a wide character with respect to standard character shapes that could be utilized. It could very well be a narrow shape, but the use of the term "wide" is with reference to the character shape to be discussed in FIG. 2 hereinafter.

Figure 2:
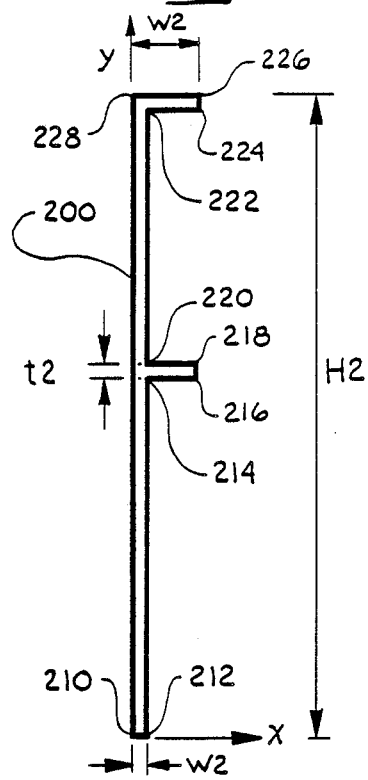
FIG. 2 is a diagrammatic representation of coordinates defining a narrow fixed reference character shape.

Referring now to FIG. 2 there is likewise shown a narrow fixed reference character shape 200 of the letter "F" which is also defined by a set of x, y coordinates of points 210, 212, 214, 216, 218, 220, 222, 224, 226, and 228. These points corresponding to points 110, 112, 114, 116, 118, 120, 122, 124, 126, 128, respectively. The narrow fixed reference character of FIG. 2 has been crafted and fixed in a desired design shape as defined by the coordinates of points 210 through 228. Although any amount could be utilized for purposes of this example, character 200 reflects a compression in overall character width with respect to character 100 of 33Δ percent, or one-third. In addition, it can be seen that the narrow fixed reference character 200 has an overall character height H2, which is equivalent to the overall character height H1 of wide fixed reference character 100. The overall width W2 of character 200 is for purposes of this example, one-third of the overall width W1 of wide fixed character 100. The character 200 also has a vertical stroke thickness w2 which is likewise one-third of the stroke width w1 of character 100. However, there are subtle changes in the arrow fixed character shape 200 which have been purposely crafted in order to make the characters, look optically correct, or optically in whatever fashion the user desires, as shown in FIG. 2. For example, the horizontal stroke width t2 of character 200 is represented by the vertical y axis distance between coordinates of the points 216 and 218. However, it does not necessarily reflect the same relationship as the proportion of overall width compression. For example, the thickness t2 of the horizontal stroke of the letter F in FIG. 2 is not one-third of horizontal stroke thickness t1 of character 100. In the example shown, the horizontal stroke thickness t2 of character 200 is approximately one-half of horizontal stroke thickness t1 of character 100. This change is purposely crafted by the user in establishing the desired shape of narrow fixed reference character 200.

In addition, other changes have been made in the relative elements of the shape of the character 200. For example, the x axis coordinates of points 116, 118 of the center horizontal stroke are set back inside the overall width W1 of character 100 as shown by the x axis coordinates of points 124, 126. However, in character 200 of FIG. 2, the center horizontal stroke has end points 216, 218, having x-axis coordinates which are not set back but are the same as the x-axis of coordinates of points 224, 226. Therefore the center horizontal stroke of the "F" extends across the entire overall width W2 of character 200. For whatever reason, a determination was made in crafting the character 200 that such a shape is the desired narrow fixed character shape to be used as a reference point in practicing the present invention.

Figure 4:
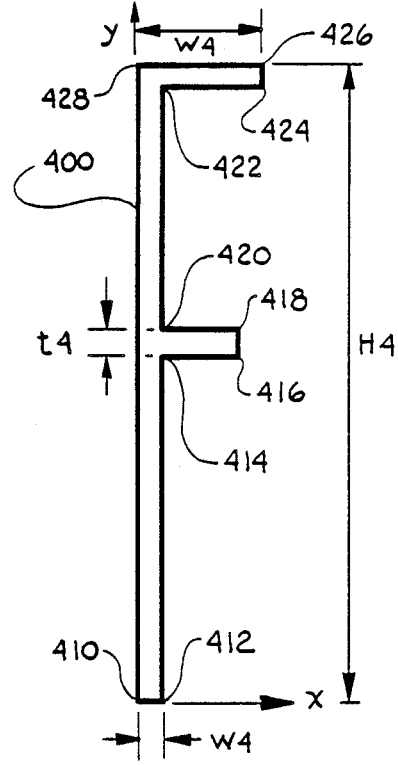
FIG. 4 is an diagrammatic representation of the character shape of FIG. 1 having been aesthetically altered in accordance with the present invention.

There is shown in FIG. 4, an aesthetically altered character shape 400 of the letter "F" having been changed in accordance with the present invention. In this example, the character has been altered, or compressed to 66⅔ of the overall width of character 100. The character shape 400 is defined by a set of x, y coordinates a points 410, 412, 414, 416, 418, 420, 422, 424, 426, and 428. These points correspond to the respective points of FIGS. 1 and 2. The character shape 400 has a vertical stroke thickness w4 and an overall character width W4, with an overall character height of H4. In addition, the horizontal strokes have a thickness t4. It can be seen from FIG. 4 that while the overall width W4 of the character 400 is two-thirds that of reference character 100, the coordinates of the points defining the shape of character 400 have been calculated in accordance with the present invention to yield an aesthetically desired character shape confined within the desired wide fixed reference character shape 100 and the desired narrow fixed reference character shape 200. This is accomplished by interpolating linearly between the corresponding coordinates of the character shape.

The desired degree of alteration (compression) to be made to wide fixed reference character 100 is in the amount of 66⅔ percent, or half-way between wide fixed reference character 100 (100 percent) and the narrow fixed reference character 200 (33⅓ percent). Thus, linear interpolation between these corresponding points would generate a set of calculated coordinates half-way between the corresponding points of wide fixed reference character 100 and those of the narrow fixed reference character 200.

For example, the horizontal stroke thickness t4 of character four hundred is calculated by interpolating between the corresponding Y coordinates of points 118 and 218, to yield the Y coordinates of point 418, and of points 116 and 216, to yield the Y coordinate of point 416. The Y coordinate values of points 118 218 remained unchanged (i.e., 7), so the Y coordinate value of 418 would equal 7.

The difference in the Y coordinate values of points 216 and 116 5.5 minus 4.0 equals 1.5.

Accordingly, the Y coordinate value for the point 416 would be altered by one-half such difference (1.5), or $\frac{3}{4}$, to yield a Y coordinate value of $4\frac{3}{4}$. The x-coordinate of point 416 of likewise adjustably by one-half the difference the x-coordinate value of point 116 (i.e., 6) and point 216 (i.e., 3) to yield an x-coordinate value of 4 TM and a Y coordinate value of $4\frac{3}{4}$.

Thus, the coordinates of points difining character 400 are generated by calculating in the computer by way by way of interpolation in the example given, each set of points defining the character shape located between the corresponding points of wide fixed reference character 100 and narrow fixed reference character 200. It can be readily be seen that if the degree of alteration of the aesthetically altered character is specific to be outside the limits shown by the corresponding coordinates of reference characters 100 and 200, that the corresponding coordinates of a character 400 can readily be calculated instead by means of extrapolation.

Figure 3:
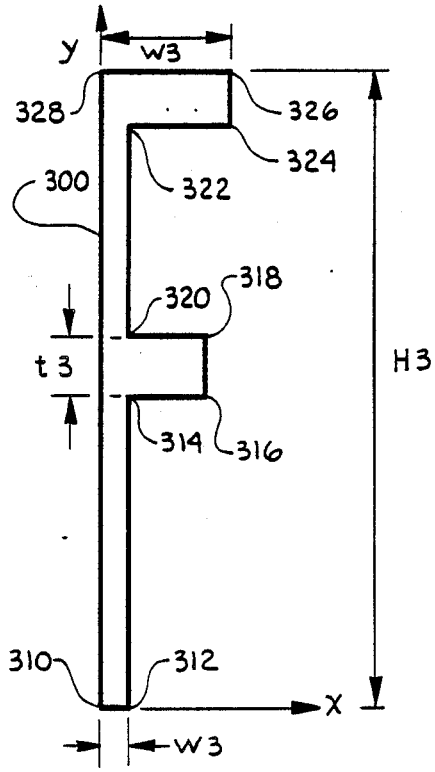
FIG. 3 is a diagrammatic representation of the character shape of FIG. 1 having been compressing by means of conventional rescaling along one axis.

It is also possible that different mathematical functions be used in the interpolation or extrapolation process in the alteration. For example, the sense of sight may more readily respond to exponential or logarithmic functions being used for purposes of interpolation or extrapolation. For that manner, depending on the desired effect, any desired function could be used for purposes of interpolation or extrapolation to create characters determined by the parameters designated by the fixed character reference shapes. There is shown in FIG. 3, a conventionally compressed character 300, having a $66\frac{2}{3}$ percent compression in width of the character 100 of FIG. 1 utilizing conventionaly techniques. The conventional technique utilizes simple linear rescaling along the X axis to generate x-coordinate values which are simply two-thirds of the X coordinate values of character 100, with the Y coordinate values unchanged. For example, character 300 of FIG. 3 has the same overall height H3, and has an overall W3 which is two-thirds the overall width of W1 of character 100, as represented by the corresponding coordinates in FIG. 3 of points 310, 312, 314, 316, 318, 320, 322, 324, 326, and 328. In addition, the X-coordinates of the points 316, 318 of the center horizontal stroke of the latter have been reduces to two-thirds of the X coordinate values of points 116, 118 of character 100 of FIG. 1. However, the horizontal stroke thickness t3 as shown by the distance between the Y coordinates values of the points 316, 318 remains unchanged in character 300 and is the same as the horizontal stroke thickness T1 of character 100 of FIG. 1. The top horizontal stroke of character 300 is likewise the same thickness as that of character 100 i.e., the Y coodinate value of points 324 and 326 are the same as the Y coordinates value of points 124 and 126 of character 100 of FIG. 1. Unfortunately, as a result of this simple conventional rescaling calculation, the conventional compressed character 300 of FIG. 3 looks aesthetically incorrect, unsightly and awkward. For example, the point 316 of conventional character 300 simply has x,y coordinates of 4, 4, respectively, contributing to unsightly character 300. However, the corresponding point 416 of aesthetically altered character 400 has x, y coordinates $4\frac{1}{2}$, $4\frac{3}{4}$, which contribute to its aesthetically appealing appearance.

The examples shown are with reference to the letter "F"; however, other letters can realiz the benefits of the present invention, especially characters which utilize curved shapes in their construction. This would also include numbers and other punctuation and designs for which alteration may be desired. In addition, specifying different "x"-heights could also create aesthetically unappealing characters by mere mechanical scaling along the x-axis. (The "X"-height is defined as the height of the lower-case letter "X", which represents the most important area of the letter form for ninety percent of lower-case letters according to experts in the field. The "X"-height is often a more realistic measurement of the size of a typeface than is the point size. Increasing the "X"-height as a percentage of the overall height of the typeface being used can increase legibility.) However, expanded or compressed type often has a lower legibility than standard type because of the shortcomings of the computer's method of generating the altered type, as shown in FIG. 3.

Figure 5:
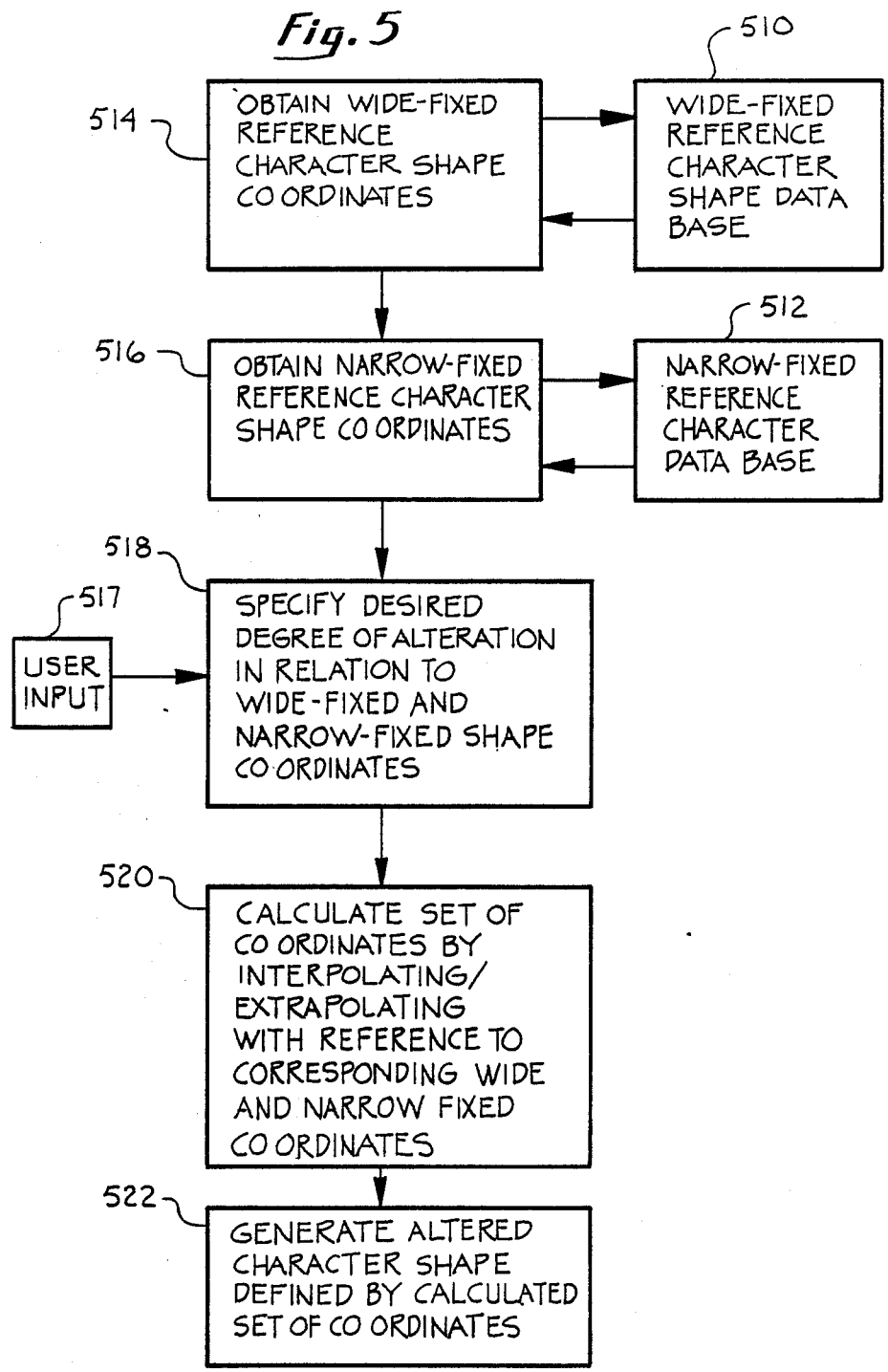
FIG. 5 is a schematic diagram of the process and system for generating aesthetically alterable character shapes in accordance with the present invention.

Referring now to FIG. 5, there is shown a schematic process flow diagram of the step in practicing the present invention. In describing the flow process, there is provided and stored a wide fixed reference character data base 510 and narrow fixed reference character data base 512 which comprise a set of coordinates of points that define the reference shapes. These points define the straight lines and curved that make up each character shape.

In the flow of the process and system, there is first obtained 514 the wide fixed reference character shape coordinates and next obtained 516 the narrow fixed reference character shape coordinates. The use inputs 517 and specifies 518 a desired degree of alteration of the character, usually from within a graphics program running on a computer. Next, the computer calculates 520 a set of coordinates by interpolating and/or extrapolating, according to the specified degree or amount of alteration, new coordinates for the points within each character with respect to the corresponding wide and narrow reference shape coodinates. Next, the computer generates 522 for display on the computer screen or printing at a suitable output device an aesthetically altered shape having the desired degree of alteration defined by the interpolated or extrapolated set of coordinates.

In practicing the present invention, it is desirable that the font type be compatible with the different font types which are commercially available.

In addition, it is to be noted that finer typographic control may be obtained by providing additional fixed reference character shape descriptions by means of sets of coordinates. For example, three, four, or more fixed reference shapes can be crafted along a spectrum within which a desired degree of alteration would be confined, to provide a more refined fixed set of reference character shapes within which to interpolate or outside which to extrapolate. The number of fixed reference character shapes in relation to a "normal" character shape would be determined by the amount of control needed over the alteration. Thus, it can be seen that by use of the present process and system, with the aid of a computer, aesthetically altered characters would avoid the awkward look (e.g., FIG. 3) and would look more aesthetically appealing and more true to the original font design, which has been heretofore unheard of in the prior art. In addition, appropiate spacing can be likewise accommondated in a similar manner between letters to further refine and realize the benefits of the present invention.

Although the present invention has been shown and described in terms of specific preferred emobodiments, it will be appreciated by those skilled in the art that changes and modifications are possible which do not depart from the inventive concepts described and taught herein. Such changes and modifications are deemed to fall within the purview of these inventive concepts. Thus, it should be noted that the accompanying description and drawings are meant to describe the preferred embodiments of the invention, but are not intended to limit the spirit and scope thereof.

What is claimed is:

1. A process for generating an altered character image design for display and use in the printing industry, with the aid of a computer, comprising the steps, executed by said computer, of:
    establishing a wide fixed character shape, said wide fixed character shape being of a particular typeface;
    establishing a narrow fixed character shape, said narrow fixed character shape also being of said particular typeface;
    providing the computer with data representing coordinates defining said wide fixed reference character shape;
    providing the computer with data representing corresponding coordinates defining said narrow fixed reference character shape;
    providing the computer with a desired percentage of alteration in relation to one of said reference character shapes;
    calculating in the computer new coordinates of an altered character shape having said desired percentage of alteration, each of said calculated coordinates being generated, when said desired percentage of alteration specifies compression of said one character shape, by interpolating between said corresponding coordinates of said wide fixed and narrow fixed reference character shapes in an amount equal to said desired percentage, and when said desired percentage of alteration specifies expansion of said one character shape, by extrapolating beyond said corresponding coordinates of said wide and narrow fixed reference character shapes in an amount equal to desired percentage; and
    generating for display on an output device said altered character shape having said new coordinates.

2. The process of claim 1, wherein said degree of alteration is defined by a desired percentage of compression of overall width of said character design, while maintaining character height.

3. The process of claim 1, wherein said degree of alteration is defined by a desired percentage of expansion of overall width of said character design, while maintaining character height.

4. The process of claim 1, wherein said interpolation is between corresponding wide fixed and narrow fixed shape coordinates based on a linear function.

5. The process of claim 1, wherein said interpolation is between corresponding wide fixed and narrow fixed shape coordinates based on a logarithmic function.

6. The process of claim 1, wherein said extrapolation is with reference to corresponding wide fixed and narrow fixed coordinates based on a linear function.

7. The process of claim 1, wherein said extrapolation is in relation to corresponding wide fixed and narrow fixed shape coordinates based on a logarithmic function.

8. The process of claim 1, wherein said wide fixed and narrow fixed reference character shapes each have an overall character height, and each of said character heights are the same, and wherein one of said wide fixed and narrow fixed reference character shapes has an increased "x" height.

9. The process of claim 1, wherein said character designs are sans-serif typeface characters.

10. The process of claim 1, wherein said wide fixed reference character shape is a standard typeface font.

11. A system for generating an altered character image shape for display and use in the printing industry, with the aid of a computer, comprising:
    means for establishing a wide fixed character shape, said wide fixed character shape being of a particular typeface;
    means for establishing a narrow fixed character shape, said narrow fixed character shape also being of said particular typeface;
    means for providing the computer with data representing coordinates defining said wide fixed reference character shape;
    means for providing the computer with data representing corresponding coordinates defining said narrow fixed reference character shape;
    means for providing the computer with a desired percentage of alteration in relation to one of said reference character shapes;
    means for calculating in the computer new coordinates of an altered character shape having said desired percentage of alteration, each of said calculated coordinates being generated, when said desired percentage of alteration specifies compression of said one character shape, by interpolating between said corresponding coordinates of said wide fixed and narrow fixed reference character shapes in an amount equal to said desired percentage, and when said desired percentage of alteration specifies expansion of said one character shape, by extrapolating beyond said corresponding coordinates of said wide and narrow fixed reference character shapes in an amount equal to desired percentage; and
    means for generating for display on an output device said altered character shape having said new coordinates.

12. The system of claim 11, wherein said degree of alteration is defined by a desired percentage of compression of overall width of said character designs, while maintaining character height.

13. The system of claim 11, wherein said degree of alteration is defined by a desired percentage of expansion of overall width of said character design, while maintaining character height.

14. The system of claim 11, wherein said interpolation is between corresponding wide fixed and narrow fixed shape coordinates based on a linear function.

15. The system of claim 11, wherein said interpolation is between corresponding wide fixed and narrow fixed shape coordinates based on a logarithmic function.

16. The system of claim 11, wherein said extrapolation is with reference to corresponding wide fixed and narrow fixed coordinates based on a linear function.

17. The system of claim 11, wherein said extrapolation is in relation to corresponding wide fixed and narrow fixed shape coordinates based on a logarithmic function.

18. The system of claim 11, wherein said wide fixed and narrow fixed reference character shapes each have an overall character height, and each of said character heights are the same, and wherein one of said wide fixed and narrow fixed reference character shapes has an increased "x" height.

19. The system of claim 11, wherein said character designs are sans-serif typeface characters.

20. The system of claim 11, wherein said wide fixed reference character shape is a standard typeface font.

* * * * *